United States Patent
Reddy et al.

(10) Patent No.: US 10,387,803 B2
(45) Date of Patent: *Aug. 20, 2019

(54) SENSOR SYSTEM FOR TRANSCODING DATA

(71) Applicant: UNITED TECHNOLOGIES CORPORATION, Farmington, CT (US)

(72) Inventors: Kishore K. Reddy, Vernon, CT (US); Edgar A. Bernal, Webster, NY (US); Michael J. Giering, Bolton, CT (US); Ryan B. Noraas, Vernon, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/840,132

(22) Filed: Dec. 13, 2017

(65) Prior Publication Data

US 2019/0050753 A1    Feb. 14, 2019

Related U.S. Application Data

(60) Provisional application No. 62/544,619, filed on Aug. 11, 2017.

(51) Int. Cl.
*G06T 5/20* (2006.01)
*G06N 20/00* (2019.01)
(Continued)

(52) U.S. Cl.
CPC ........... *G06N 20/00* (2019.01); *G06K 9/6262* (2013.01); *G06N 3/08* (2013.01); *G06N 3/0454* (2013.01)

(58) Field of Classification Search
CPC ..... G06T 5/20; G06T 2207/2008; G06T 5/10; H04N 5/23229; H04N 7/181;
(Continued)

(56) References Cited

U.S. PATENT DOCUMENTS 6,714,925 B1* 3/2004 Barnhill ............... G06K 9/6228
706/48
6,754,380 B1* 6/2004 Suzuki ..................... G06K 9/32
382/156

(Continued)

FOREIGN PATENT DOCUMENTS

| EP | 0877309 | 11/1998 |
|---|---|---|
| EP | 1367248 | 12/2003 |
| WO | 2016100814 | 6/2016 |

OTHER PUBLICATIONS

European Patent Office, European Search Report dated Nov. 21, 2018 in Application No. 18184761.7-1208.

(Continued)

*Primary Examiner* — Yon J Couso
(74) *Attorney, Agent, or Firm* — Snell & Wilmer, L.L.P.

(57) ABSTRACT

A sensor system may comprise a sensor; a processor in electronic communication with the sensor; and/or a tangible, non-transitory memory configured to communicate with the processor, the tangible, non-transitory memory having instructions stored thereon that, in response to execution by the processor, cause the processor to perform operations. The operations may comprise recording, by the sensor, a preliminary type data sample; and/or applying, by the processor, a mapping function having a plurality of tuned parameters to the preliminary type data sample, producing a desired type data output.

17 Claims, 3 Drawing Sheets

(51) Int. Cl.
*G06K 9/62* (2006.01)
*G06N 3/08* (2006.01)
*G06N 3/04* (2006.01)

(58) Field of Classification Search
CPC .. G06K 9/6256; G06K 9/6262; G06N 99/005; G06N 20/00; G06N 3/08; G06N 3/0454
See application file for complete search history.

(56) References Cited

U.S. PATENT DOCUMENTS

| | | | |
|---|---|---|---|
| 8,825,682 B2 * | 9/2014 | Kishi | G06F 17/30247 358/1.17 |
| 2004/0135788 A1 | 7/2004 | Davidson | |
| 2011/0313953 A1 | 12/2011 | Lane et al. | |
| 2016/0178355 A1 | 6/2016 | Ge et al. | |
| 2016/0224858 A1 | 8/2016 | Chen | |

OTHER PUBLICATIONS

Fengzhi Pan: "New image super-resolution scheme based on residual error restoration by neural networks", Optical Engineering., vol. 42, No. 10, Oct. 1, 2003 (Oct. 1, 2013), pp. 3038-3046.

Qu Yanyun et al: "Single Image Super-Resolution via Convolutional Neural Network and Total Variation Regularization", Jan. 1, 2016 (Jan. 1, 2016), International Conference on Simulation, Modeling, and Programming for Autonomous Robots,SIMPAR 2010; [Lecture Notes in Computer Science; LECT.Notes Computer], Springer, Berlin, Heidelberg, pp. 28-38.

Kim Jiwon et al: Accurate Image Super-Resolution Using Very Deep Convolutional Networks11 , 2016 IEEE Conference on Computer Vision and Pattern Recognition (CVPR), IEEE, Jun. 27, 2016 (Jun. 27, 2016), pp. 1646-1654.

Yudong Liang et al: "Single Image Super-resolution with a Parameter Economic Residual-like Convolutional Neural Network", ARXIV. Org, Cornell University Library, 201 Olin Library Cornell University Ithaca, NY 14853, Mar. 23, 2017.

Bernal et al., U.S. Appl. No. 15/807,359, filed Nov. 8, 2017 entitled "Sensor System for Data Enhancement".

USPTO, Pre-Interview First Office Action dated Jan. 2, 2019 in U.S. Appl. No. 15/807,359.

European Patent Office, European Search Report dated Jan. 7, 2019 in Application No. 18187113.8.

USPTO, First Action Interview Office Action dated Feb. 28, 2019 in U.S. Appl. No. 15/807,359.

USPTO, Notice of Allowance dated May 21, 2019 in U.S. Appl. No. 15/807,359.

* cited by examiner

SENSOR SYSTEM FOR TRANSCODING DATA

CROSS-REFERENCE TO RELATED APPLICATION

This application is a Non-Provisional of, and claims priority to, and the benefit of U.S. Ser. No. 62/544,619 filed Aug. 11, 2017 and entitled "SENSOR SYSTEM FOR TRANSCODING DATA," which is hereby incorporated by reference in its entirety.

FIELD

The present disclosure relates to a sensor system for transcoding a first type of data to produce a second type of data related to the first type of data.

BACKGROUND

Sensors, recorders, or other devices configured to capture or record data of a surrounding environment (collectively, "sensors") may be used in various implementations such as personal use, use on a vehicle for surveying purposes, or the like. However, a sensor may only be able to capture a limited number of types of data (e.g., visual data such as a video recording or still imagery, time series data such as audio data, acceleration or speed data, and other types of data such as depth data, and/or the like). For example, a video sensor may only be capable of recording image data and not audio data, or audio/visual data and not textual data. Spatial and/or cost constraints may not allow for all the types of sensors required to obtain all desired types of data.

SUMMARY

In various embodiments, a method may comprise determining, by a processor, a plurality of tuned parameters of a mapping function. Determining the plurality of tuned parameters may comprise initializing, by the processor, a plurality of tunable parameters of the mapping function configured to be applied to a first training preliminary type data sample; producing, by the processor, a first training output by applying the mapping function to a plurality of first training preliminary type data inputs comprised in the first training preliminary type data sample; comparing, by the processor, the first training output to a first training desired type data sample associated with the first training preliminary type data sample; calculating, by the processor, a first difference between the first training output and the first training desired type data sample; and/or adjusting, by the processor, the plurality of tunable parameters in the mapping function to decrease the first difference between the first training output and the first training desired type data sample.

In various embodiments, adjusting the plurality of tunable parameters produces a plurality of first adjusted parameters, wherein the determining the plurality of tuned parameters may further comprise: producing, by the processor, a second training output by applying the mapping function having the plurality of first adjusted parameters to a plurality of second training preliminary type data inputs comprised in a second training preliminary type data sample; comparing, by the processor, the second training output to a second training desired type data sample associated with the second training preliminary type data sample; calculating, by the processor, a second difference between the second training output and the second training desired type data sample; and/or adjusting, by the processor, the plurality of first adjusted parameters in the mapping function to decrease the second difference between the second training output and the second training desired type data sample.

In various embodiments, applying the mapping function having the plurality of tunable parameters to the plurality of first training preliminary type data inputs may comprise applying, by the processor, the mapping function to a first training preliminary type data input, producing a first training output data point. In various embodiments, comparing the first training output to the first training desired type data sample may comprise comparing, by the processor, the first training output data point to a first training desired type data point comprised in the first training desired type data sample. In various embodiments, calculating the first difference may comprise calculating, by the processor, a first data point difference between the first training output data point and the first training desired type data point. In various embodiments, the first difference may reflect at least one of a single value difference between the first training output and the first training desired type data sample, and a distribution difference between an output distribution of values of the first training output and a desired type data sample distribution of values of the first desired type data sample. In various embodiments, adjusting the plurality of tunable parameters may comprise adjusting, by the processor, the values of the plurality of tunable parameters of the mapping function to decrease the first data point difference between the first training output data point and the first training desired type data point.

In various embodiments, the method may further comprise applying, by the processor, the mapping function having the plurality of tuned parameters to a preliminary type data sample, producing a desired type data output. In various embodiments, applying the mapping function having the plurality of tuned parameters to the preliminary type data sample may comprise applying, by the processor, the mapping function having the plurality of tuned parameters to a first preliminary type data input comprised in the preliminary type data sample, producing a first desired type data output data point; and/or applying, by the processor, the mapping function having the plurality of tuned parameters to a second preliminary type data input comprised in the preliminary type data sample, producing a second desired type data output data point. Producing the desired type data output may comprise combining, by the processor, the first desired type data output data point and the second desired type data output data point, wherein the desired type data output comprises the first desired type data output data point and the second desired type data output data point.

In various embodiments, the preliminary type data sample may comprise a recording. In various embodiments, the first preliminary type data input may be a first data point of the recording, and the second preliminary type data input may be a second data point of the recording. In various embodiments, the recording may comprise at least one of a video recording, a time series recording, or a still image recording.

In various embodiments, a system may comprise a sensor; a processor in electronic communication with the sensor; and/or a tangible, non-transitory memory configured to communicate with the processor, the tangible, non-transitory memory having instructions stored thereon that, in response to execution by the processor, cause the processor to perform operations. The operations may comprise recording, by the sensor, a preliminary type data sample; and/or applying, by the processor, a mapping function having a plurality of tuned parameters to the preliminary type data sample, producing a desired type data output. In various embodiments, applying the mapping function having the plurality of tuned parameters to the preliminary type data sample may comprise applying, by the processor, the mapping function having the plurality of tuned parameters to a first preliminary type data input comprised in the preliminary type data sample, producing a first desired type data output data point; and/or applying, by the processor, the mapping function having the plurality of tuned parameters to a second preliminary type data input comprised in the preliminary type data sample, producing a second desired type data output data point. Producing the desired type data output may comprise combining, by the processor, the first desired type data output data point and the second desired type data output data point, wherein the desired type data output comprises the first desired type data output data point and the second desired type data output data point.

In various embodiments, the preliminary type data sample may comprise a first type of data and the desired type data output may comprise a second type of data. In various embodiments, the first preliminary type data input may be a first data point of the first type of data, and the second preliminary type data input may be a second data point of the first type of data. In various embodiments, the first type of data and the second type of data may each comprise at least one of a video recording, a time series recording, a depth data recording, or a still image recording. The first type of data and the second type of data may be different.

In various embodiments, the operations of the processor may further comprise determining, by the processor, the plurality of tuned parameters of the mapping function configured to modify the preliminary type data sample before the applying the mapping function having the plurality of tuned parameters to the preliminary type data sample. In various embodiments, determining the plurality of tuned parameters may comprise initializing, by the processor, a plurality of tunable parameters of the mapping function configured to be applied to a first training preliminary type data sample; applying, by the processor, the plurality of tunable parameters of the mapping function to a plurality of first training preliminary type data inputs comprised in the first training preliminary type data sample, producing a first training output; comparing, by the processor, the first training output to a first training desired type data sample associated with the first training preliminary type data sample; calculating, by the processor, a first difference between the first training output and the first training desired type data sample; and/or adjusting, by the processor, the plurality of tunable parameters in the mapping function to decrease the first difference between the first training output and the first training desired type data sample.

In various embodiments, applying the mapping function having the plurality of tunable parameters to the plurality of first training preliminary type data inputs may comprise applying, by the processor, the mapping function having a first set of tunable parameters of the plurality of tunable parameters to a first training preliminary type data input, producing a first training output data point. In various embodiments, comparing the first training output to the first training desired type data sample may comprise comparing, by the processor, the first training output data point to a first training desired type data point comprised in the first training desired type data sample. In various embodiments, calculating the first difference may comprise calculating, by the processor, a first data point difference between the first training output data point and the first training desired type data point. In various embodiments, adjusting the plurality of tunable parameters may comprise adjusting, by the processor, the first set of tunable parameters in the mapping function to decrease the first data point difference between the first training output data point and the first training desired type data point.

In various embodiments, an article of manufacture including a non-transitory, tangible computer readable storage medium having instructions stored thereon that, in response to execution by a processor, cause the processor to perform operations. The operations may comprise determining a plurality of tuned parameters of a mapping function configured to modify a preliminary type data sample, wherein the processor is configured to apply the mapping function having the plurality of tuned parameters to the preliminary type data sample to produce a desired type data output. In various embodiments, determining the plurality of tuned parameters may comprise initializing a plurality of tunable parameters in the mapping function configured to be applied to a first training preliminary type data sample; applying the mapping function having the plurality of tunable parameters to a plurality of first training preliminary type data inputs comprised in the first training preliminary type data sample, producing a first training output; comparing the first training output to a first training desired type data sample associated with the first training preliminary type data sample; calculating a first difference between the first training output and the first training desired type data sample; and/or adjusting the plurality of tunable parameters in the mapping function to decrease the first difference between the first training output and the first training desired type data sample.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Sensors are devices that measure physical properties of an environment and produce an output signal which is representative of the measured property of the environment. Examples of sensors include imaging sensors such as those commonly found in a still or video camera, which are often coupled to optics and produce an image of a given scene; time series sensors (e.g., audio sensors) such as microphones which operate by detecting differences in air pressure and transforming them into electrical signals; motion or inertial sensors such as accelerometers, which measure the acceleration to which they are subject along one or more axes of motion. We refer to the differences between the data captured by different sensor types as data modalities; namely, audio is one data modality while video is a different data modality. Note that different sensors may produce identical or different data modalities or data types.

Figure 1A:
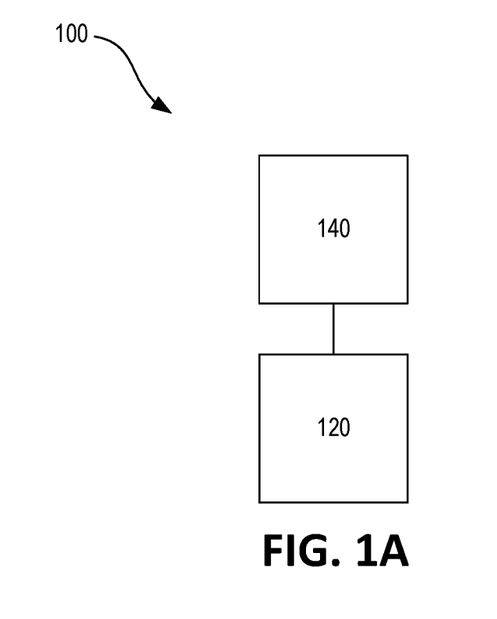
FIG. 1A illustrates a block diagram of a sensor system, in accordance with various embodiments.

With reference to FIG. 1A, a block diagram of a sensor system 100 is illustrated, in accordance with various embodiments. Sensor system 100 may comprise a processor 120 in electronic communication with a first sensor 140. Sensor system 100 may be configured to capture preliminary type data via a preliminary type sensor (e.g., first sensor 140), and via processor 120, transcode the preliminary type data to produce desired type output data (e.g., data resembling that which that may have been captured by a desired type sensor (e.g., second sensor 160)). Preliminary type data may be one type of data (e.g., video recording data), and desired type data may be another type of data (e.g., audio data), which the preliminary type data is manipulated by processor 120 to resemble. Therefore, sensor system 100 may be referred to as a virtual sensor because instead of directly measuring environmental properties with a desired type sensor, sensor system 100 utilizes processor 100 to transcode preliminary type data into desired type data output.

Figure 1B:
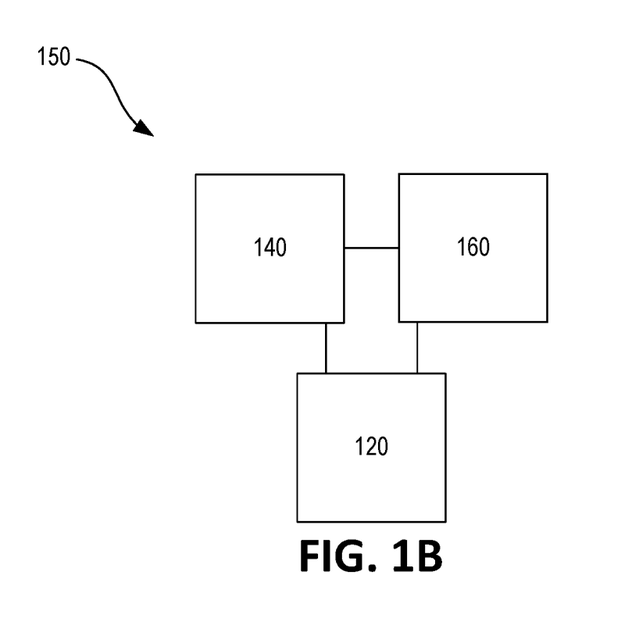
FIG. 1B illustrates a block diagram of a sensor training system, in accordance with various embodiments.

In various embodiments, processor 120 may be comprised in first sensor 140 and/or second sensor 160 (depicted in FIG. 1B). Processor 120 may be configured to operate as a data acquisition and digital signal processing system. For example, processor 120 may receive data acquired by first sensor 140 and/or second sensor 160. Such data may be processed, stored, and/or analyzed by processor 120. In various embodiments, processor 120 may comprise an analog to digital converter, which may be configured to receive analog data acquired by first sensor 140 and/or second sensor 160 and convert it to digital data for processing by processor 120.

In various embodiments, processor 120 may be configured to implement various logical operations in response to execution of instructions, for example, instructions stored on a non-transitory, tangible, computer-readable medium. In various embodiments, the transitory, tangible, computer-readable medium and/or processor 120 may be comprised in an article of manufacture. As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101. In various embodiments, the processor may be configured to implement smart algorithms to transcode preliminary type data to produce desired type data output.

In various embodiments, in order to get sensor system 100 and processor 120 to be able to process preliminary type data captured by first sensor 140 into desired type data output, processor 120 first may be trained to do so. Training processor 120 may comprise teaching processor 120 to operate on inputs of preliminary type data, and applying at least one transformation or mapping function expressed in terms of tuned parameters to the inputs of preliminary type data to produce outputs resembling corresponding desired type data (i.e., desired type data output). That is, the mapping function may comprise tuned (or tunable) parameters. Therefore, training the processor 120 to transcode preliminary type data to produce desired type data output may comprise determining the tuned parameters (i.e., the optimal value of the tunable parameters) of the mapping function to be applied to the preliminary type data.

In various embodiments, sensor training system 150 in FIG. 1B may be utilized to train processor 120 to transcode preliminary type data from sensor 140 to produce desired type data resembling data from a second sensor 160. Sensor training system 150 may comprise processor 120, first sensor 140, and a second sensor 160. Second sensor 160 may be in electronic communication with first sensor 140 and/or processor 120. In various embodiments, first sensor 140 may be a preliminary type sensor, meaning, sensor 140 captures preliminary type data representing the surrounding environment (e.g., visual environment, audio environment, and/or the like), the preliminary type data being a different data type than the data desired. In various embodiments, second sensor 160 may be a desired type sensor, meaning, second sensor 160 captures desired type data representing the surrounding environment, different than the preliminary data type (e.g., preliminary type data may be video data, while desired type data may be audio data). First sensor 140 and/or second sensor 160 may be any suitable device to capture data of the surrounding environment such as a time series sensor (e.g., audio sensor), video sensor, depth or range sensor, still image sensor (e.g., a camera), motion sensor, and/or a sensor to detect and/or capture the characteristics of the surrounding environment, each of which may produce different data types.

Figure 2:
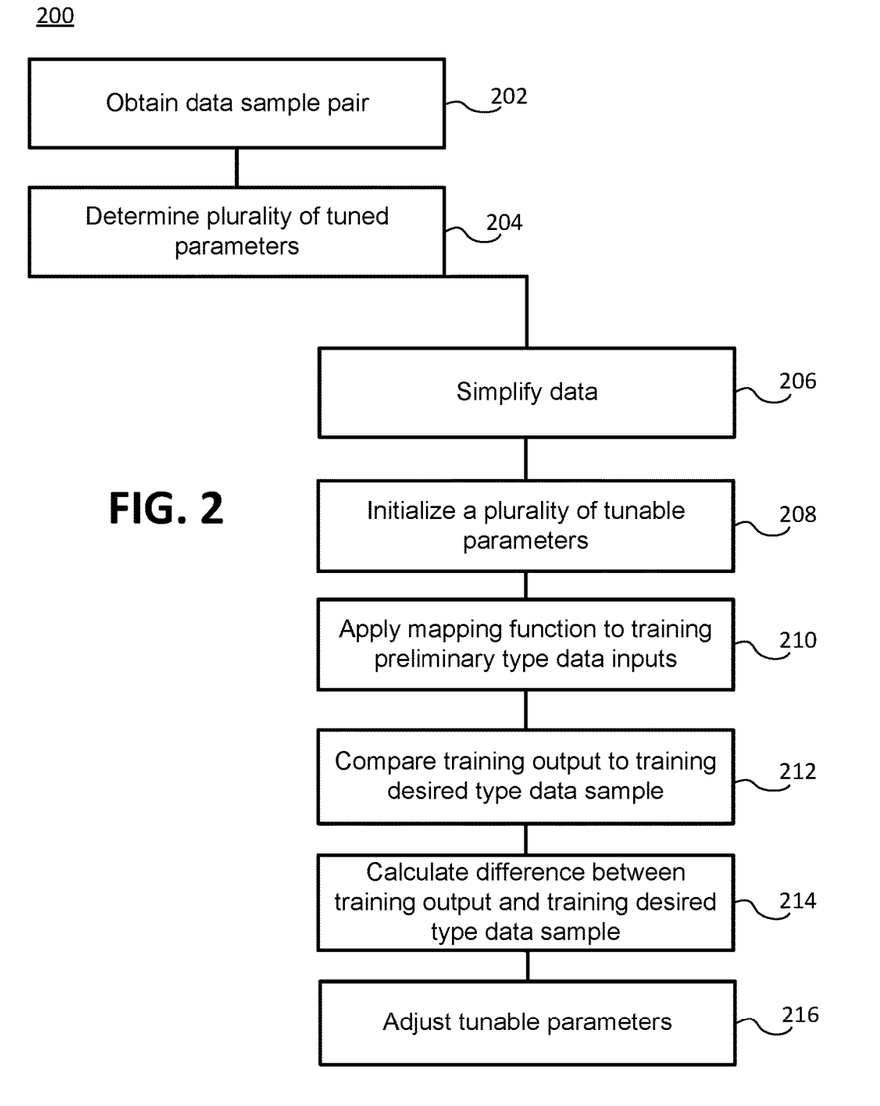
FIG. 2 illustrates a method for determining tuned parameters, in accordance with various embodiments.

In accordance with various embodiments, FIG. 2 depicts a method 200 for determining tuned parameters of the mapping function, which processor 120 may apply to preliminary type data to transcode the preliminary type data, producing the desired type data output. In various embodiments, with combined reference to FIGS. 1B and 2, processor 120 may obtain a data sample pair (step 202) comprising a training preliminary type data sample, representing a first recording of an environment with a first type of data, and a corresponding training desired type data sample representing a second recording of the same environment as the training preliminary type data sample with a second type of data different than the first type of data. For example, the first recording may comprise a video recording, time series recording (e.g., an audio recording), still image, depth data, speed or acceleration data, or the like, and the second recording may comprise a recording with a different data type than the first recording (e.g., a time series recording (e.g., an audio recording), still image, depth data, speed or acceleration data, a video recording, or the like). The training preliminary type data sample and the training desired type data sample may have a connection or correlation with one another because they capture information relevant to the same event or environment. For example, first sensor 140 may capture a video recording (i.e., the training preliminary type data sample) of an environment, which may be preliminary type data because another type of data (e.g., audio data) is desired. Second sensor 140 may capture an audio recording (i.e., the corresponding training desired type data sample) of the same environment as first sensor 140. Therefore, first sensor 140 captured the video data and second sensor captured the audio data of the same environment or event. In various embodiments, processor 120 may receive the video recording from first sensor 140 and the audio recording from second sensor 160. In various embodiments, processor 120 may receive numerous (e.g., thousands) of data sample pairs from first sensor 140 and second sensor 160, each data sample pair comprising a training preliminary type data sample and a training desired type data sample reflecting different types of related data for the same environment.

Processor 120 may determine the tuned parameters (comprised in the mapping function) (step 204) required to transcode preliminary type data into data resembling desired type data by utilizing the data sample pairs. There may be a different set of tuned parameters for every preliminary data type being transcoded to a desired data type (e.g., a plurality of tuned parameters for transcoding video data to audio data, or vice versa, transcoding video and/or audio data to text data, or vice versa, transcoding visual data to depth data, or vice versa, transcoding video data to speed and/or acceleration data, and/or the like). Therefore, in various embodiments, processor 120 may receive data sample pairs of preliminary data type recordings and related desired data type recordings. In various embodiments, the data sample pairs captured by first sensor 140 and second sensor 160 may comprise multiple data types, for example the preliminary data type may comprise video data and the desired data type may comprise audio and text data, or the preliminary data type may comprise video and text data and the desired data type may comprise audio data, and/or the like. Going forward, the explanation of method 200 will be in relation to a preliminary data type of video data and a desired data type of audio data, but it should be understood that method 200 could be applied to any suitable data types, such as those discussed herein.

In various embodiments, in each data sample pair, the training preliminary type data sample may comprise training preliminary type data inputs and the training desired type data sample may comprise training desired type data points. The training preliminary type data inputs may comprise data points of the training preliminary type data samples in which the data inputs are comprised. Likewise, the training desired type data points may be portions of the training desired type data samples in which the data points are comprised. For example, a frame and/or a group of frames may be a training preliminary type data input from the preliminary type video recording (i.e., the training preliminary type data sample). A sound wave segment and/or a group of sound wave segments may be a training desired type data point from the desired type audio recording (i.e., the training desired type data sample). Continuing with the example above with a training preliminary type data sample comprising video data and a training desired type data sample comprising audio data, processor 120 may simplify the data (step 206) comprised in the training preliminary type data sample (the preliminary type data inputs) and/or the training desired type data sample (the desired type data points). For example, processor 120 may take a given number of frames (i.e., one million data points or preliminary type data inputs) of the training preliminary type data sample from first sensor 140 requiring a given amount of bytes to be represented, and reduce the number of bytes required to represent the training preliminary type data sample. The training preliminary type data inputs may be simplified by passing data points of the training preliminary type data sample through a series of non-linear mapping functions (e.g., polynomial functions, exponential functions, sigmoidal functions, piecewise linear functions, and/or the like), resulting in a lower dimensional space representation (i.e., simplified data inputs) that may fully capture the statistics of the data. The lower dimensional space representation in which simplified data inputs lie may be referred to as an intermediate low-dimensional space. In a similar manner, in various embodiments, processor 120 may simplify the one million sound waves, for example (i.e., a given number of data points, or desired type data points, of the training desired type data sample from second sensor 160 requiring a given number of bytes to be represented), and reduce the required number of bytes required for representation that fully captures the statistics of the data, lying on a different intermediate low-dimensional space.

In various embodiments, the mapping function that maps (i.e., transcodes) preliminary type input data into data resembling desired type data may have multiple steps comprising a first mapping from the input low-dimensional space to a first intermediate low-dimensional space, a second mapping from the first intermediate low-dimensional space to a second low-dimensional space, and a third mapping from the second low-dimensional space to the high dimensional space corresponding to desired type output data. In various embodiments, the number of intermediate spaces and mappings may vary. In various embodiments, the stage of mapping the final low-dimensional space to the high dimensional space may comprise an inverse function of the aforementioned mapping function from the desired type output space into the second low-dimensional space in order to enhance the low-dimensional space to the high dimensional space. In various embodiments, relating to a still image, for example, the intermediate spaces may represent high-level abstractions of pixel data. In various embodiments, the intermediate spaces may represent probability density functions describing the distribution of pixel values. In response to the intermediate spaces capturing the statistical nature of the data, the mapping that produces desired type data may consist of a non-linear mapping function that performs density sampling.

In various embodiments, at least some of the data sample pairs comprising associated preliminary type and desired type data samples, of the data sample pairs received by processor 120, may be used to determine the tunable parameters in the mapping functions. In various embodiments, the number of data points the training desired type data sample is reduced to (i.e., desired type data points) may equal the reduced number of training preliminary type data points (i.e., preliminary type data inputs). The data points of a training preliminary type data sample, whether raw or simplified data, may be referred to as "training preliminary type data inputs." The data points of a training desired type data sample, may be referred to as "training desired type data points." Each training preliminary type data input(s) may be associated with a corresponding training desired type data point(s). For example, a training preliminary type data input representing video data of a person saying the word "telephone" may be associated with a training desired type data point representing the audio data of the same person saying "telephone." In various embodiments, processor 120 may not simplify data comprised in the training preliminary type data sample (the preliminary type data inputs) and/or the training desired type data sample (the desired type data points).

In various embodiments, the tunable parameters of the mapping function may be initialized (step 208) (i.e., given an initial value or weight) in any suitable manner, for example, randomly. Processor 120 may initialize the tunable parameters. Processor 120 may begin by processing a first data sample pair (comprising a (first) training preliminary type data sample and a (first) training desired type data sample). Processor 120 may apply the mapping function having the initialized tunable parameters to the training preliminary type data inputs (step 210) comprised in the training preliminary type data sample, producing a first training output. Accordingly, in various embodiments, applying the mapping function having the tunable parameters to the training preliminary type data inputs may comprise processor 120 applying a mapping function having a first set of tunable parameters (or a first mapping function with a (set of) tunable parameters) to a first training preliminary type data input (for example, at least a portion of the video recording) producing a first training output data point. In various embodiments, determining the tuned parameters (i.e., tunable parameters having an optimal value(s)) of a mapping function may be an iterative process. Therefore, applying the mapping function having the tunable parameters to the training preliminary type data inputs may further comprise processor 120 applying a mapping function having a second set of tunable parameters (or a second mapping function with a (set of) tunable parameters) to a second training preliminary type data input producing a second training output data point, applying a mapping function having a third set of tunable parameters of the mapping function (or a third mapping function with a (set of) tunable parameters) to a third training preliminary type data input producing a third training output data point, and so on until at least a desired fraction of the training preliminary type data inputs are manipulated by various tunable parameter(s). In various embodiments, the same mapping function having a set of tunable parameters may be applied to many or all, or at least a portion of, training preliminary type data inputs of a training preliminary type data sample (i.e., the first training preliminary type data input, the second training preliminary type data input, and/or the third training preliminary type data input may be modified by the same mapping function with the same tunable parameter(s) to produce the first, second, and third training output data points, respectively).

In various embodiments, producing the first training output (via processor's 120 application of the mapping function having the tunable parameters to the first training preliminary type data inputs) may comprise combining the training output data points (e.g., the first training output data point, second training output data point, third training output data point, etc.). That is, in various embodiments, the tunable parameters may be adjusted after processing a group of data points. In various embodiments, the iterative updates may be performed in accordance with Newton's method, coordinate descent methods, conjugate gradient descent methods, gradient descent methods, genetic algorithms, and the like. In various embodiments, the mapping functions having tunable parameters (or tuned parameters) may be implemented in the form of a feedforward neural network, a convolutional neural network, an autoencoder, a convolutional autoencoder, a recurrent neural network, a recurrent autoencoder, and/or the like.

Before optimal parameters are determined (i.e., the tuned parameters), the output of applying the mapping function having the tunable parameters of the mapping function to training preliminary type data sample may produce a training output that does not resemble the training desired type data sample. For example, the audio data produced by applying the tunable parameters to the training preliminary type data sample (e.g., a video recording), may not resemble the audio recording (the training desired type data sample) corresponding to the video recording. Therefore, in various embodiments, processor 120 may compare the first training output to the first training desired type data sample from second sensor 160 (i.e., the desired output) (step 212). Processor 120 may calculate a difference between the first training output and the first training desired type data sample (step 214). The difference between the first training output and the first training desired type data sample may be, in various embodiments, a single value difference or an absolute difference, a mean squared difference, or the like. In various embodiments, the difference may be a distribution difference between an output distribution difference of the first training output and a desired type data sample distribution of values of the first desired type data sample. The distribution difference may reflect the difference in the distribution of first training output data points and first training desired type data points. In other words, the distribution difference may be a statistical difference reflecting how well the distribution of first training output data points matches the distribution of the training desired type data points. The distribution difference may be measured via the use of an adversarial loss or a divergence metric.

Based on the calculated difference, processor 120 may adjust the tunable parameters (216) to decrease the difference calculated between the first training output and the first training desired type data sample. As an example, the first training output may be audio data related to the video recording captured by first sensor 140, but the audio data may still be different than the desired audio data from second sensor 160 (e.g., having less resolution, or simply comprising data that does not match the desired audio data, and therefore would not produce the desired audio recording). Therefore, the tunable parameters of the mapping function may be adjusted such that when the mapping function having the adjusted tunable parameters is applied to the first training preliminary type data sample, the resulting training output has a single number value (which may result from the single number value determined by the non-linear mappings) that is closer to a single number value associated with the first desired type data sample (the desired audio data). In other words the training output (audio data output) may more closely resemble the first training desired type data sample (the desired audio data). In various embodiments, the tunable parameters of mapping functions that process desired type data to produce preliminary type data may be adjusted at the same time as the tunable parameters of mapping functions that process preliminary type data to produce desired type data.

In various embodiments, comparing the first training output to the training desired type data sample may be completed at the data point level. Accordingly, comparing the first training output to the training desired type data sample may comprise processor 120 comparing the first training output data point (the data point of the first training output produced by processor 120 applying the first tunable parameter, for first set of tunable parameters to the first training preliminary type data input) with a corresponding first desired type data point (of the first desired type data sample). In various embodiments, the single number values determined by the non-linear mappings may be compared. Processor 120 may also, as this is an iterative process, compare a second and/or third training output data point (other data points of the first training output) with a corresponding second and/or third desired type data points (of the first desired type data sample), and so forth. Similarly, in various embodiments, calculating the difference between the first training output and the training desired type data sample may be completed at the data point level. Accordingly, calculating the difference between the first training output and the training desired type data sample may comprise processor 120 calculating a difference between the first training output data point and the first training desired type data point (i.e., the difference between the single number values resulting from the non-linear mappings). Processor 120 may likewise calculate the differences between the second training output data point and the second training desired type data point, the third training output data point and the third training desired type data point, and so on. In other words, consistent with the example above, processor 120 may be comparing data points produced from the application of the functional mapping to the preliminary type video recording with their corresponding specific data points of the desired type audio recording (corresponding in that the data points may have been captured under the same circumstances (e.g., position, point in time, etc.) by their respective sensors).

In calculating the differences between training output data points of the training output and training desired type data points of the training desired type data sample, processor 120 may adjust the tunable parameters on a more precise level (e.g., one tunable parameter or a select group of tunable parameters) rather than adjusting all tunable parameters at once. In various embodiments, the contribution of each tunable parameter in the mapping function to the difference between the training output and training desired type data sample is estimated, and each tunable parameter may be adjusted in a direction conducive to decreasing the difference. For instance, if increasing the value of one tunable parameter results in an increased difference between the training output and the corresponding desired type training data input, then the tunable parameter may be decreased. Accordingly, adjusting the tunable parameters may comprise processor 120 adjusting the first (set of) tunable parameter(s) to decrease the difference between the first training output data point(s) and the first training desired type data point(s). For example, applying a mapping function having a first (set of) tunable parameter(s) to a first training preliminary type data point(s) may result in a first training output data point(s) comprising a single number value of 100 (which may be one of multiple values), while the corresponding first training desired type data point(s) may have a single number value of 150 (which may be one of multiple values). Therefore, processor 120 may adjust the first tunable parameter(s) such that the first training output data point(s) may comprise a value closer to 150 (i.e., for example, resulting in audio data output that is closer to the desired audio data sample). The adjustment of the first (set of) tunable parameter(s) may not completely eliminate the difference between the first training output data point(s) and the first training desired type data point(s), because another training preliminary type data point in another training data sample pair may require the first tunable parameter to be a value different than that required in the first training data sample pair. Likewise, as this is an iterative process, processor 120 may adjust the second (set of) tunable parameter(s) to decrease the difference between the second training output data point(s) and the second training desired type data point(s), the third (set of) tunable parameter(s) to decrease the difference between the third training output data point(s) and the third training desired type data point(s), and so on.

By conducting steps 210-216 on data points of training preliminary type data sample (i.e., individual or specific groups of training preliminary type data inputs), processor 120 is able to more precisely adjust the tunable parameters, by adjusting individual or specific groups of tunable parameters based on the differences calculated between training preliminary type data inputs and their respective training desired type data points.

In various embodiments, determining the tuned parameters may be an iterative process. Therefore, to continue determining the tuned parameters (step 204), processor 120 may repeat steps 210-216 on additional data sample pairs (e.g., a second data sample pair comprising a second training preliminary type data sample and a second training desired type data sample, a third data sample pair comprising a third training preliminary type data sample and a third training desired type data sample, etc.). Adjusting the tunable parameters from the processing of the first data sample pair may have produced first adjusted parameters, and thus, processor 120 may apply the mapping function having the first adjusted parameters to the second data sample pair. Processor 120 may use the further adjusted tunable parameters from processing a previous data sample pair on a subsequent data sample pair to continuously improve the tunable parameters and determine the tuned parameters. Processor 120 may repeat steps 210-216 to determine the tuned parameters until the magnitude of the adjustment of the tunable parameters resulting from the difference between the $n^{th}$ training output and the $n^{th}$ training desired type data sample is below a predetermined threshold, and/or steps 210-216 are repeated a predetermined number of times with a predetermined number of data sample pairs. At such a point, processor 120 may have determined the tuned parameters of the mapping function (i.e., the mapping function having the tuned parameters comprising an average single number value, for example, the application of which may result in the best "educated guess" in what a corresponding desired type data sample of a preliminary type data sample comprises).

Figure 3:
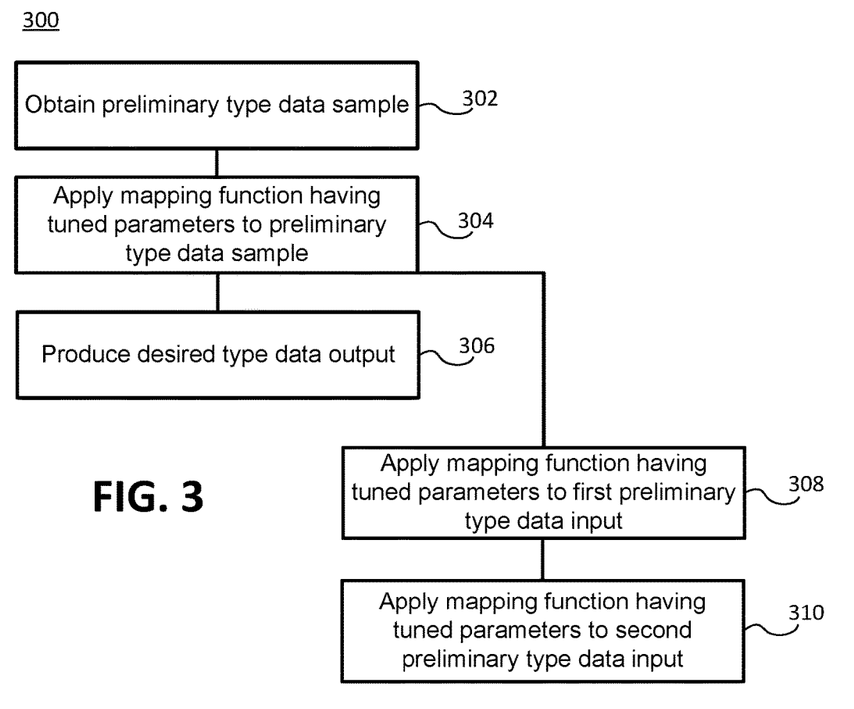
FIG. 3 illustrates a method for applying tuned parameters to a preliminary type data sample, in accordance with various embodiments.

In response to determining the tuned parameters, sensor system 100 may be utilized to transcode preliminary type data into desired type data. Once the tuned parameters are determined for transcoding a type(s) of data into another type(s) of data, the mapping function having the tuned parameters may be used in any situation for transcoding such types of data. With combined reference to FIGS. 1A and 3, FIG. 3 depicts a method 300 for applying the mapping function having the tuned parameters (i.e., a tuned mapping function) determined by method 200 in FIG. 2 to a preliminary type data sample (which may be previously unseen by system 100 and/or processor 120). In various embodiments, processor 120 of sensor system 100 may receive a first preliminary type data sample (step 302) from first sensor 140 (e.g., a video recording). Processor may apply the mapping function having the tuned parameters to the first preliminary type data sample (step 304) to produce a first desired type data output (step 306) that may resemble a desired type data sample (e.g., an audio recording) captured by second sensor 160 (a desired type sensor) of the same environment or event as that captured by first sensor 140 (a preliminary type sensor).

In various embodiments, applying the mapping function having the tuned parameters to the first preliminary type data sample (step 304) (the first preliminary type data sample being previously unseen by system 100 and/or processor 120) may comprise processor 120 applying the mapping function with tuned parameters to a first preliminary type data input (i.e., a first data point of the first preliminary type data sample) (step 308) producing a first desired type data output data point (i.e., a first data point of the first desired type data output), applying the mapping function having the tuned parameters to a second preliminary type data input (i.e., a second data point of the first preliminary type data sample) (step 310) producing a second desired type data output data point (i.e., a second data point of the first desired type data output), and continuing to apply the mapping function having the tuned parameters to preliminary type data inputs up to applying the $n^{th}$ functional mapping having tuned parameters to the $n^{th}$ preliminary type data input (until at least a desired data point, or every data point, of the preliminary type data sample has been modified by its respective tuned parameter(s)). Accordingly, producing the first desired type data output (step 306) from the processed first preliminary type data sample may comprise processor 120 combining the first desired type data output data point and the second desired type data output data point, along with any other data output data points produced by the application of the tuned parameters of the mapping function to their respective preliminary type data inputs.

In various embodiments, each mapping function having a tuned parameter(s) may be configured to transcode the preliminary type data inputs in various ways. For example, in a visual preliminary type recording (e.g., a video recording) with an audio desired type recording, one mapping function having a tuned parameter(s) may be configured to recognize and transcode a person's mouth saying a word by the mouth movements, or a person's mouth saying a phonetic sound. Another mapping function with a tuned parameter(s) may be configured to recognize depth maps of a scene from color images. Yet another mapping function having a tuned parameter(s) may be configured to recognize and transcode sounds associated with movements. Therefore, as an example, for a preliminary type data input representing a data point of the visual preliminary type recording comprising a person saying "telephone", the preliminary type data input may comprise a value(S) that will cause the application of the tuned parameter configured to recognize and transcode speech by persons to produce a desired type data output data point with a higher value than a preliminary type data input representing a data point of the video preliminary type recording without a person saying "telephone."

Returning to the example of the first preliminary type data sample representing a preliminary type video recording, the production of the first desired type data output may occur by processor 120 applying the mapping function having the tuned parameters (or mapping functions having specific tuned parameters) to their respective preliminary type data inputs (i.e., data points of the preliminary type video recording), producing respective desired type data output data points (i.e., data points of the desired type audio recording), and in various embodiments, combining the produced desired type data output data points to create the desired type data output (i.e., the desired type audio recording). As discussed herein, the preliminary type data sample to be processed by processor 120 and sensor system 100 may be any type of recording such as a video recording, a time series recording (e.g., audio recording), audio/visual recording, still image, or the like. In various embodiments, the tunable parameters of mapping functions from desired type data to preliminary type data may be adjusted at the same time as the tunable parameters of mapping functions from preliminary type data to desired type data.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   determining, by a processor, a plurality of tuned parameters of a mapping function, wherein the determining the plurality of tuned parameters comprises:
      initializing, by the processor, a plurality of tunable parameters of the mapping function configured to be applied to a first training preliminary type data sample comprising a first data type, wherein the first training preliminary type data sample is captured by a first sensor type;
      producing, by the processor, a first training output by applying the mapping function to a plurality of first training preliminary type data inputs comprised in the first training preliminary type data sample;
      comparing, by the processor, the first training output to a first training desired type data sample associated with the first training preliminary type data sample, wherein the first training desired type data sample comprises a second data type that is different than the first data type, wherein the first training desired type data sample is captured by a second sensor type, wherein the first sensor type and the second sensor type are different;
      calculating, by the processor, a first difference between the first training output and the first training desired type data sample;
      adjusting, by the processor, the plurality of tunable parameters in the mapping function to decrease the first difference between the first training output and the first training desired type data sample, wherein the adjusting the plurality of tunable parameters produces a plurality of first adjusted parameters;
      producing, by the processor, a second training output by applying the mapping function having the plurality of first adjusted parameters to a plurality of second training preliminary type data inputs comprised in a second training preliminary type data sample, wherein the second training preliminary type data sample comprises the first data type;
      comparing, by the processor, the second training output to a second training desired type data sample associated with the second training preliminary type data sample, wherein the second training desired type data sample comprises the second data type;
      calculating, by the processor, a second difference between the second training output and the second training desired type data sample; and
      adjusting, by the processor, the plurality of first adjusted parameters in the mapping function to decrease the second difference between the second training output and the second training desired type data sample.

2. The method of claim 1, wherein the applying the mapping function having the plurality of tunable parameters to the plurality of first training preliminary type data inputs comprises applying, by the processor, the mapping function to a first training preliminary type data input, producing a first training output data point.

3. The method of claim 2, wherein the comparing the first training output to the first training desired type data sample comprises comparing, by the processor, the first training output data point to a first training desired type data point comprised in the first training desired type data sample.

4. The method of claim 3, wherein the calculating the first difference comprises calculating, by the processor, a first data point difference between the first training output data point and the first training desired type data point.

5. The method of claim 4, wherein the first difference reflects at least one of a single value difference between the first training output and the first training desired type data sample, and a distribution difference between an output distribution of values of the first training output and a desired type data sample distribution of values of the first desired type data sample.

6. The method of claim 4, wherein the adjusting the plurality of tunable parameters comprises adjusting, by the processor, the values of the plurality of tunable parameters in the mapping function to decrease the first data point difference between the first training output data point and the first training desired type data point.

7. The method of claim 1, further comprising:
   applying, by the processor, the mapping function having the plurality of tuned parameters to a preliminary type data sample, producing a desired type data output, wherein the applying the mapping function having the plurality of tuned parameters to the preliminary type data sample comprises:
      applying, by the processor, the mapping function having the plurality of tuned parameters to a first preliminary type data input comprised in the preliminary type data sample, producing a first desired type data output data point; and
      applying, by the processor, the mapping function having the plurality of tuned parameters to a second preliminary type data input comprised in the preliminary type data sample, producing a second desired type data output data point, and
      wherein the producing the desired type data output comprises combining, by the processor, the first desired type data output data point and the second desired type data output data point, wherein the desired type data output comprises the first desired type data output data point and the second desired type data output data point.

8. The method of claim 7, wherein the preliminary type data sample comprises a recording.

9. The method of claim 8, wherein the recording comprises at least one of a video recording, a time series recording, or a still image recording.

10. A system, comprising:
   a first sensor type configured to record data having a first data type;
   a processor in electronic communication with the first sensor type; and
   a tangible, non-transitory memory configured to communicate with the processor, the tangible, non-transitory memory having instructions stored thereon that, in response to execution by the processor, cause the processor to perform operations comprising:
      determining, by the processor, a plurality of tuned parameters of a mapping function, wherein the determining the plurality of tuned parameters comprises:
         initializing, by the processor, a plurality of tunable parameters of the mapping function configured to be applied to the first training preliminary type data sample comprising the first data type, wherein the first training preliminary type data sample is captured by the first sensor type;
         producing, by the processor, a first training output by applying the mapping function to a plurality of first training preliminary type data inputs comprised in the first training preliminary type data sample;

comparing, by the processor, the first training output to a first training desired type data sample associated with the first training preliminary type data sample, wherein the first training desired type data sample comprises a second data type that is different than the first data type, wherein the first training desired type data sample is captured by a second sensor type, wherein the first sensor type and the second sensor type are different;

calculating, by the processor, a first difference between the first training output and the first training desired type data sample;

adjusting, by the processor, the plurality of tunable parameters in the mapping function to decrease the first difference between the first training output and the first training desired type data sample, wherein the adjusting the plurality of tunable parameters produces a plurality of first adjusted parameters;

producing, by the processor, a second training output by applying the mapping function having the plurality of first adjusted parameters to a plurality of second training preliminary type data inputs comprised in a second training preliminary type data sample, wherein the second training preliminary type data sample comprises the first data type;

comparing, by the processor, the second training output to a second training desired type data sample associated with the second training preliminary type data sample, wherein the second training desired type data sample comprises the second data type;

calculating, by the processor, a second difference between the second training output and the second training desired type data sample; and adjusting, by the processor, the plurality of first adjusted parameters in the mapping function to decrease the second difference between the second training output and the second training desired type data sample.

11. The system of claim 10, wherein the operations further comprise:

recording, by the first sensor type, a preliminary type data sample comprising the first data type; and applying, by the processor, the mapping function having the plurality of tuned parameters to the preliminary type data sample, producing a desired type data output comprising the second data type.

12. The system of claim 11, wherein the applying the mapping function having the plurality of tuned parameters to the preliminary type data sample comprises:

applying, by the processor, the mapping function having the plurality of tuned parameters to a first preliminary type data input comprised in the preliminary type data sample, producing a first desired type data output data point, and applying, by the processor, the mapping function having the plurality of tuned parameters to a second preliminary type data input comprised in the preliminary type data sample, producing a second desired type data output data point, and wherein the producing the desired type data output comprises combining, by the processor, the first desired type data output data point and the second desired type data output data point, wherein the desired type data output comprises the first desired type data output data point and the second desired type data output data point.

13. The system of claim 12, wherein the first preliminary type data input is a first data point of the first data type, and the second preliminary type data input is a second data point of the first data type.

14. The system of claim 12, wherein the first data type and the second data type each comprise at least one of a video recording, a time series recording, a depth data recording, or a still image recording, wherein the first data type and the second data type are different.

15. The system of claim 10, wherein the applying the mapping function having the plurality of tunable parameters to the plurality of first training preliminary type data inputs comprises applying, by the processor, the mapping function having a first set of tunable parameters of the plurality of tunable parameters to a first training preliminary type data input, producing a first training output data point, and wherein the comparing the first training output to the first training desired type data sample comprises comparing, by the processor, the first training output data point to a first training desired type data point comprised in the first training desired type data sample.

16. The system of claim 15, wherein the calculating the first difference comprises calculating, by the processor, a first data point difference between the first training output data point and the first training desired type data point, and wherein the adjusting the plurality of tunable parameters comprises adjusting, by the processor, the first set of tunable parameters in the mapping function to decrease the first data point difference between the first training output data point and the first training desired type data point.

17. An article of manufacture including a non-transitory, tangible computer readable storage medium having instructions stored thereon that, in response to execution by a processor, cause the processor to perform operations comprising:

determining a plurality of tuned parameters of a mapping function configured to modify a preliminary type data sample captured by a first sensor type, wherein the preliminary type data sample comprises a first data type; and applying the mapping function having the plurality of tuned parameters to the preliminary type data sample to produce a desired type data output comprising a second data type, wherein the first data type and the second data type are different, wherein the determining the plurality of tuned parameters comprises:

initializing, by the processor, a plurality of tunable parameters in the mapping function configured to be applied to a first training preliminary type data sample comprising the first data type, wherein the first training preliminary type data sample is captured by the first sensor type;

applying, by the processor, the mapping function having the plurality of tunable parameters to a plurality of first training preliminary type data inputs comprised in the first training preliminary type data sample, producing a first training output;

comparing, by the processor, the first training output to a first training desired type data sample associated with the first training preliminary type data sample, wherein the first training desired type data sample comprises the second data type and is captured by a second sensor type, wherein the first sensor type and the second sensor type are different;

calculating, by the processor, a first difference between the first training output and the first training desired type data sample;

adjusting, by the processor, the plurality of tunable parameters in the mapping function to decrease the first difference between the first training output and the first training desired type data sample, wherein the adjusting the plurality of tunable parameters produces a plurality of first adjusted parameters;

producing, by the processor, a second training output by applying the mapping function having the plurality of first adjusted parameters to a plurality of second training preliminary type data inputs comprised in a second training preliminary type data sample, wherein the second training preliminary type data sample comprises the first data type;

comparing, by the processor, the second training output to a second training desired type data sample associated with the second training preliminary type data sample, wherein the second training desired type data sample comprises the second data type;

calculating, by the processor, a second difference between the second training output and the second training desired type data sample; and adjusting, by the processor, the plurality of first adjusted parameters in the mapping function to decrease the second difference between the second training output and the second training desired type data sample.

* * * * *